Feb. 10, 1953     C. M. PERKINS     2,627,955
SELF-ENERGIZING MEANS FOR INTERENGAGING
SYNCHRONIZER FRICTION PLATES
Filed Jan. 12, 1951     2 SHEETS—SHEET 1

Inventor
CHARLES M. PERKINS
By
Attorney

Feb. 10, 1953
C. M. PERKINS
2,627,955
SELF-ENERGIZING MEANS FOR INTERENGAGING
SYNCHRONIZER FRICTION PLATES
Filed Jan. 12, 1951
2 SHEETS—SHEET 2
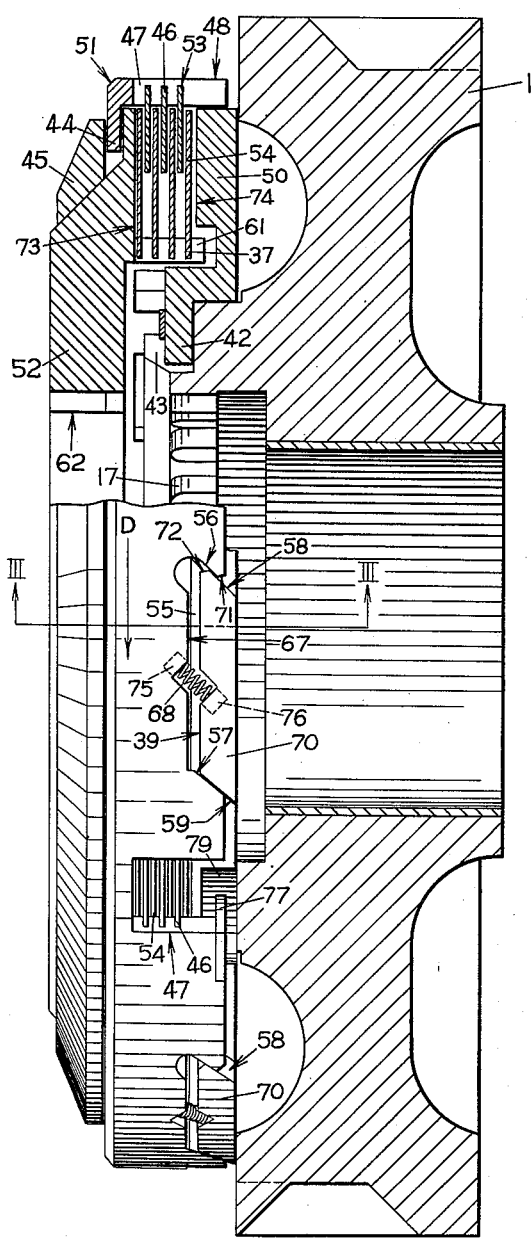
fig. 2
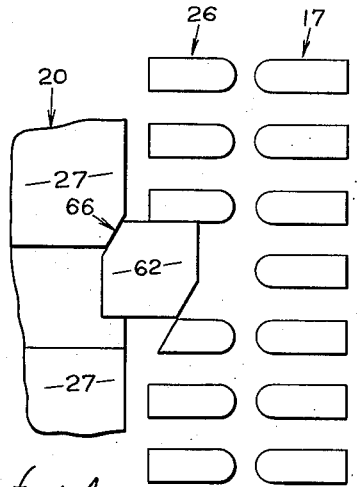
fig. 4
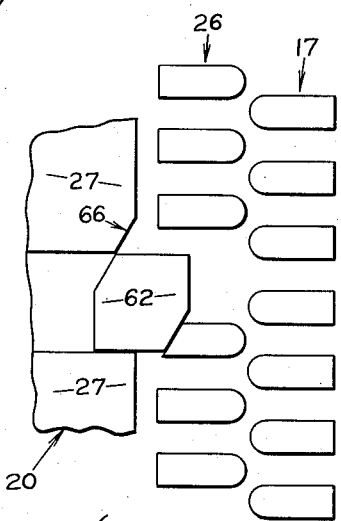
fig. 5
CHARLES M. PERKINS
Inventor
By
Attorney Patented Feb. 10, 1953

2,627,955

UNITED STATES PATENT OFFICE 2,627,955

SELF-ENERGIZING MEANS FOR INTERENGAGING SYNCHRONIZER FRICTION PLATES

Charles M. Perkins, Kalamazoo, Mich., assignor to Fuller Manufacturing Company, a corporation of Delaware Application January 12, 1951, Serial No. 205,721

6 Claims. (Cl. 192—53)

This invention relates to a friction type synchronizer for change speed gearing having toothed clutch members wherein one set of said clutch members is, prior to synchronization, always rotating at a higher velocity than the other set thereof, and this invention relates particularly to means incorporated into the synchronizer by which the frictionally engaging portions thereof may be urged together by utilizing the energy of the rotating parts therein.

In presently known synchronizer apparatus of the type involving mutually engaging frictional surfaces, and wherein one toothed element moves axially toward the other toothed element for effecting synchronization and interengagement therewith, it is the present common practice to rely wholly upon the force effecting such axial movement for imposing the necessary pressure upon the mutually contacting frictional elements. In cases involving light transmissions of the type used on passenger vehicles, this is satisfactory inasmuch as the inertias of the rotating parts to be synchronized are sufficiently small that they are easily overcome. However, in larger synchronizers, such as those used in large trucks or large stationary engines, the inertias of said rotating parts require more force to overcome than can be conveniently or satisfactorily supplied manually during an ordinary shifting operation.

Further, in multi-speed transmission apparatus, such as the structure shown by the application of Ludvigsen and Backus, Serial No. 133,404, wherein widely different speed ratios are to be synchronized in a minimum of time, it may be desirous to provide a greater force urging the frictional surfaces into engagement with each other than can be conveniently supplied manually.

The attempts made in the past to meet this problem have, insofar as I am aware, been primarily directed toward a particular structure of the interengaging frictional surfaces. In other cases, means have been provided by which a relatively greater shifting force, either through power shifting of the parts to be synchronized or through linkage structures, has been applied to the movable toothed element, in order to apply greater force to the interengaging frictional surfaces by the same means effecting the interengagement of said toothed elements. These attempts have, in some cases relieved the seriousness of the problem, but in no case has any of these structures provided a wholly effective solution.

Therefore, it is desirable to provide means by which the energy of the faster rotating of two engageable elements is utilized for urging said frictional surfaces together, thereby serving the double purpose of aiding the synchronization by applying the load to the more rapidly rotating part, and of effecting the interengagement of the frictional surfaces from a source of power which is ample and necessarily present in all respects.

Accordingly, a principal object of this invention is to provide in a friction type synchronizer means for utilizing the rotational energy of one of the parts to be synchronized for urging the frictional elements of the synchronizer into engagement with each other.

A further object of the invention is to provide in a synchronizer, as aforesaid, means by which the rotative energy of the faster of the two parts to be synchronized may be utilized for effecting engagement of the frictional elements.

A further object of the invention is to provide a synchronizer, as aforesaid, which is simple, durable in its construction and reliable in its operation.

A further object of this invention is to provide a synchronizer, as aforesaid, which will normally be wholly inoperable and which will be brought into operation by the same force which initiates engagement of the elements to be synchronized.

Further objects and purposes of the invention will become apparent to persons familiar with this type of structure upon reading the following specification and upon examination of the accompanying drawings.

In the drawings:

Figure 2 represents a partially sectioned, side view of the synchronizer mechanism removed from the transmission.

Figure 3 represents a fragment of the synchronizer partially sectioned along the line III—III of Figure 2 and showing the parts in a different operating position.

Figure 4 represents a tooth pattern of the parts prior to synchronization.

Figure 5 represents a tooth pattern of the parts upon the attainment of synchronization.

Figure 6 represents a fragment of the inner ring 50 viewed axially from the rightward side as appearing in Figure 2.

Figure 7 represents a fragment of the outer ring 51 viewed axially from the right as appearing in Figure 2.

General description

Figure 1:
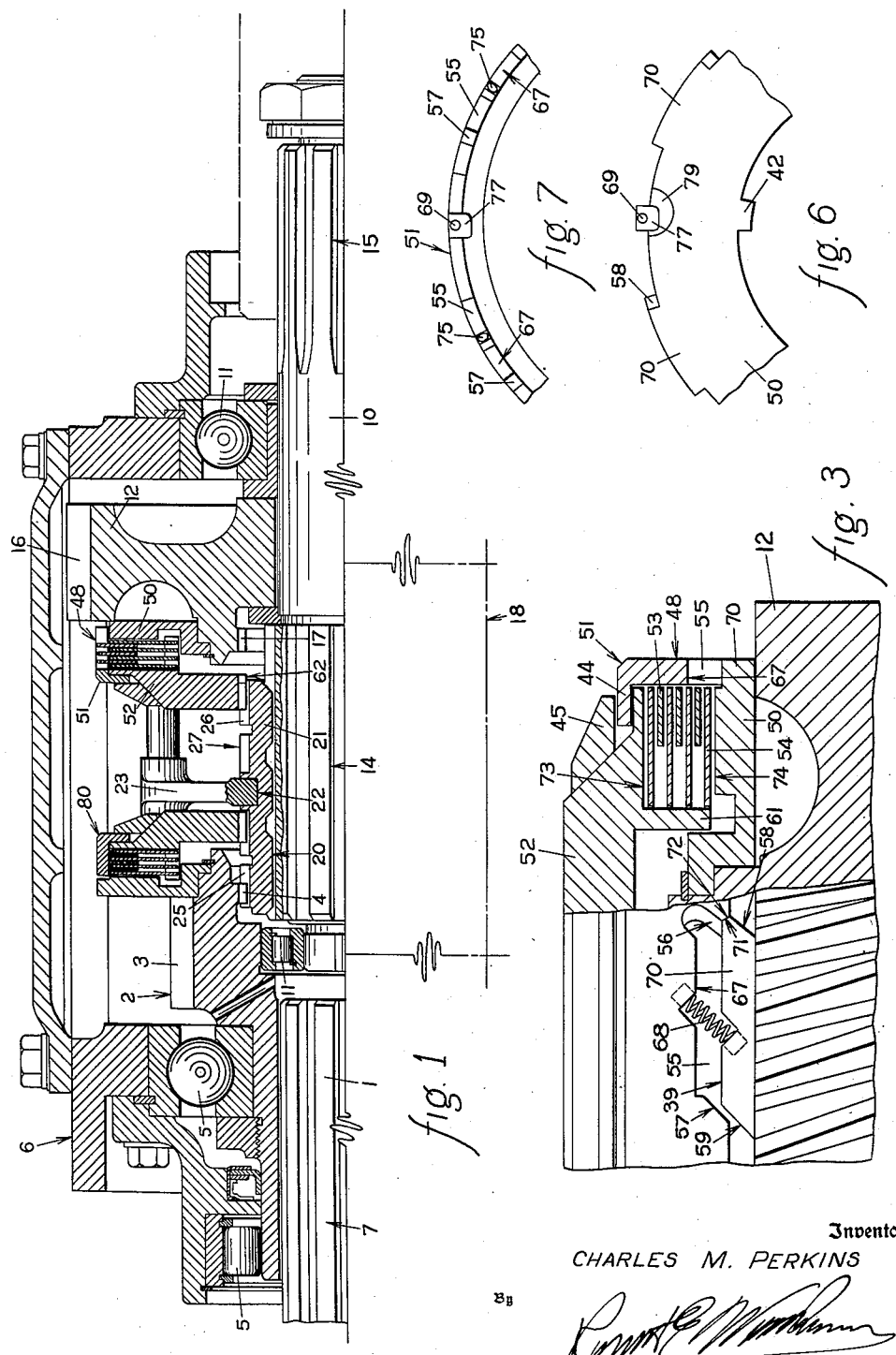
Figure 1 represents in central section a view of the upper half of a transmission utilizing a synchronizer employing the self-energizing features of this invention.

In meeting the objects and purposes set forth above, and with particular reference to a synchronizer having a first set of friction plates and a second set of friction plates interleaved therewith, I have provided means by which one of said sets of plates is rotated in a conventional manner by a floating ring associated with a balk tooth which rotates with the faster rotating of the engageable elements, and the other set of plates is rotated by an outer ring which is in turn movably mounted upon an inner ring, said inner ring being mounted upon and rotatable with the slower rotating of said engageable elements. The said inner and outer rings, though movable with respect to each other both axially and circumferentially, are limited in such movement both axially and circumferentially and are interengaged by means including a pair of surfaces positioned at an angle with the plane of rotation of any point thereon in order that rotative movement originating in the outer ring will act through said angular surfaces to cause said inner and outer rings to move axially toward each other. The friction plates are so interleaved that when the outer ring moves toward the inner ring, the said plates will be so pressed against each other as to effect said interengagement therebetween and thus cause a very effective frictional driving of the said inner ring by the floating ring.

Detailed description

The general constructional details of the synchronizer being utilized for illustrative purposes, are set forth in detail in an application for United States patent filed by me concurrently herewith, Serial No. 205,722, filed January 12, 1951, and entitled "Interengaging Tooth Structure for a Synchronizer," to which reference is made for full disclosure thereof, but, for the purpose of easy reference here, those portions of said details which are particularly pertinent to the structure presently concerned will also be set forth herein.

A driving shaft 1 supports at one end a small gear 2 having external gear teeth 3 and internal gear, or clutch, teeth 4. Said shaft 1 is conventionally supported upon the bearings 5 within one end of the housing 6 and splined at 7 for engagement with the gear 2.

A driven shaft 10 is conventionally supported upon the bearings 11 and extends from the other end of said housing 6. Said shafts and bearings and the means supporting same are all provided with conventional locking means and oil or grease retaining means. A large gear 12 is rotatably supported upon the shaft 10 intermediate the ends thereof, which ends are splined at 14 and 15. Said gear 12 is provided with external teeth 16 and internal or clutch teeth 17. The gears 2 and 12 are interconnected by conventional gearing indicated generally by the center lines 18, said gearing forming no part of the present invention.

A cylindrical sleeve 20 (Figure 1) is provided with internal splining 21 for engagement with the splining 14, and with an external circumferential groove 22 for receiving the shift fork 23. Said sleeve 20 is further provided at each axial end thereof with the external teeth 25 and 26 in the land 27 for engagement, respectively, with the teeth 4 and 17. The shift fork 23 is operated in any conventional manner.

The synchronizing mechanism

Turning now to the synchronizing mechanism as such (Figures 2, 3, 4 and 5), it is comprised primarily of the inner ring 50, which is mounted upon, and rotates with, the gear 12, the outer ring 51, which is supported upon and is rotatable with the inner ring 50 in a manner detailed hereinafter, and the floating ring 52. Said ring 50 is drivingly connected to the gear 12 by tongues 42 and grooves 43 (Figures 2 and 4) in any convenient manner.

The outer ring 51 (Figures 2 and 3) has a radially inwardly extending flange 44 which may or may not be integral therewith and is slidably disposed between the floating ring 52 and a clamping ring 45, which latter is welded or otherwise mounted on the floating ring 52. The outer ring 51 can thus rotate with respect to the floating ring 52 but cannot move axially in either direction with respect thereto. Ring 51 supports a plurality of parallel, spaced, circular friction plates or rings 53, which are drivingly connected to said ring 51 by the radially outwardly extending lugs 46 disposed in the slots 47 in the cylindrical portion 48 of the outer ring 51. Between the friction rings, there are provided spacer plates or rings 54 having spaced, radially inwardly extending lugs 37 for purposes hereinafter described.

The outer ring 51 has a plurality, here six, of slots 55 cut into the edge of cylindrical portion 48 extending beyond said rings 53 and 54, each of which slots 55 has its circumferential endwalls 56 and 57 slanted for reasons appearing hereinafter.

The inner ring 50 is provided with a plurality, here six, of radially outwardly extending lugs 70 (Figures 2, 3 and 4), each having slanted ends 58 and 59 corresponding to the slanted endwalls 56 and 57 of the slots 55. The slanted endwalls 56 and 58 preferably have their respective tips provided with bevels 71 and 72, respectively, for purposes appearing hereinafter. Thus, when the outer ring 51 rotates in a direction indicated by the arrow D in Figure 2, the inner and outer rings will be drawn axially together if the respective slanted end walls 56 and 58 are engaged. However, if there has previously been sufficient disengagement and sufficient axial separation of the inner and outer rings to disengage the surfaces 56 and 58, then the beveled portions 71 and 72 will be engaged (Figure 3) and prevent the accidental reengagement of said surfaces 56 and 58 by such rotation and, thereby, will prevent accidental drawing together of the rings 50 and 51 of the synchronizer.

The floating ring 52, which is disposed between the flange 44 and the friction and spacer rings, is provided with a plurality of axially disposed fingers 61 extending toward the inner ring 50 between the lugs 37 on the spacer ring 54 for snug engagement thereby. Thus, the spacer rings 54 must rotate with the floating ring 52 whereas the friction rings 53 must rotate with the outer ring 51. Except when the gear 12 and sleeve 20 are synchronized, the friction rings 53 and the spacer rings 54 will accordingly rotate at different speeds. Sufficient space, but no more than necessary, is provided between the opposing faces 73 and 74 of the floating ring 52 and inner ring 50, respectively, to permit this difference in rotational speeds of the friction rings 53 and spacer rings 54. The spacer and friction rings can be compressed together, thereby preventing relative movement therebetween, by a slight axial movement of the floating ring 52 toward the inner ring 50.

The floating ring 52 is provided with internally extending balk teeth 62 which are engageable with the teeth 26 of the sleeve 20 in a conventional manner or in the manner set forth in said patent application filed concurrently herewith.

In the axial face 39 of each lug 70 and the opposing axial wall 67 of each respective slot 55, within which said lugs 70 are received, is a pair of recesses 76 and 75, respectively, whose axes are coincident and substantially parallel with the angular face 58 of the lug 70. A resilient means, such as a spring 68, is held under compression within and between these recesses for the purpose of normally urging the inner ring 50 and the outer ring 51 axially apart. The axial displacement of the outer ring 51 with respect to the inner ring 50 by said springs 68 is accurately limited by a plurality of stops 77, which are secured to flange 48 of the outer ring 51, as by the screws 69 (Figures 2, 4 and 5), and engage a wall of the opening 79 in the periphery of the inner ring 50. Thus, the axial displacement of the inner and outer rings will be so limited that at the point of greatest separation the beveled surfaces 72 and 71 will be in engagement.

All of the foregoing description has made specific reference to the synchronizer mechanism appearing in association with the gear 12 and the rightward end of the sleeve 20, as appearing in Figure 1. It will be understood, of course, that a similar synchronizer mechanism 80 (Figure 1) may be provided with the gear 2 at the leftward end of the sleeve 20, which mechanism is substantially a mirror image of the mechanism herein described. Thus, individual description of the synchronizer 80 is omitted.

Operation

Although the operation of the device to which this invention relates will be apparent from the foregoing description, it will be reviewed further in the interest of completeness. In this connection, it should be noted that engagement of the clutch teeth will often occur at other than exact synchronization, so long as substantial synchronization is present. For example, if the difference in relative rotation is small, such as 3 R. P. M., interengagement of the clutch teeth becomes practicable without unreasonable noise or shock. Hence, in the following description of the operation of the herein disclosed device, the term "synchronization" will be understood to include both exact and substantial synchronization excepting where it is specifically stated otherwise.

Beginning with the clutch teeth engaged, so that there is no load at all on the synchronizer, the springs 68 will hold the inner and outer rings 50 and 51 in their extreme separated positions, the limit of such movement of the ring 51 leftwardly as appearing in Figure 2 with respect to the ring 50 being determined by the stop 77 on the screw 69. At this point, the beveled surfaces 71 and 72 will contact each other, as appearing in Figure 3, so that the rings 50 and 51 are held apart and any accidental contacting between the friction plates and the spacer plates, such as may be occasioned by vibration or road roughness, will not initiate synchronization.

Now assuming that the clutch teeth 26 and 17 are not engaged, as when the slide 20 is in its leftward position as shown in Figure 1, there will be a slight rotative tendency on the outer ring 51 due to the frictional engagement between the outer ring 51 and the floating ring 52, since these rings will normally be rotating in the same direction but at different speeds. However, self-energization of the synchronizer due to this load will be positively prevented by the interengagement of the bevels 71 and 72 on the outer and inner rings, respectively. Such interengagement of the bevels 71 and 72 is brought about by the springs 68 either when the clutch teeth 26 and 17 are engaged, or when the transmission is not in operation.

Thus, engagement between the slanted surfaces 56 and 58, which is necessary to effect self-energization is positively prevented by the bevels 71 and 72 under both of the above mentioned two conditions.

When engagement of the teeth 26 and the teeth 17 is desired, the shift fork 23 will be operated to move the sleeve 20 rightwardly as appearing in Figure 1. This will act against the balk tooth 62 in a conventional manner, or in the manner described in detail in the application filed by me concurrently herewith and entitled "Interengaging Tooth Structure for a Synchronizer," and thus moves the floating ring 52, which is secured to said balk tooth 62, rightwardly as appearing in Figures 1 and 2. Since the outer ring 51 will not move axially with respect to the floating ring 52, movement of the floating ring 52 will cause a movement of said outer ring 51 also rightwardly and thus push the bevel 71 off the bevel 72 so that the surfaces 56 and 58 become engaged in the manner illustrated in Figure 2. Because of the frictional engagement between the floating ring 52 and the outer ring 51, the rotational energy of the floating ring 52 will be in part transferred to the outer ring 51 and, since the floating ring 52 is moving faster than the gear 12, the outer ring 51 will tend to move faster than the inner ring 50. Due to the interengagement of the surfaces 56 and 58, this will compress the rings 53 and 54 against each other and between the opposed surfaces 73 and 74 of the floating and inner rings, respectively. It will be recognized that as the outer ring 51 is urged rightwardly by the interengagement of the annular surfaces 56 and 58, the outer ring will tighten itself further against the floating ring 52 and thus increase a driving relationship between said two parts. This will still further increase the compressive forces interengaging the friction and spacer rings 53 and 54 and thus the operation is self generating without the further application of rightwardly directed force to the shift fork 23, and the parts will very quickly reach synchronization.

Thus, even with very wide differentials of rotative speed existing between the elements to be synchronized prior to the synchronizing operation, and even with relatively high inertias to be overcome by the synchronizing operation, by thus utilizing the energy present in the more rapidly moving element, the necessary force for contacting the frictional surfaces is made amply available and, simultaneously, a means is provided for slowing the faster moving element to the speed of the slower moving element.

As the clutch teeth 17 and 26 reach synchronization, the rightwardly directed shifting force, being continuously applied, will immediately complete interengagement of said clutch teeth.

It will be recognized that with the attainment of synchronization between the teeth 17 and 26, the rings 51, 52 and 50 will also become synchronized. The attainment of exact synchronization between the outer ring 51 and the inner ring 50 will also terminate the drawing together of these rings, and will thereby terminate the pressure on the plates 53 and 54, caused by the interaction of the surfaces 56 and 58. This would permit the parts to become unsynchronized but, with the shifting force applied continuously, as it is, interengagement of the teeth will occur immediately and before synchronization is lost. Analyzed further, it will be seen that so long as the parts are not synchronized, the pressure of the shifting force on the sleeve 20 acting against the balk tooth 62 will maintain a force against the pressure plates 53 and 54 even if an approaching condition of synchronization is permitting a weakening of the pressure originating in the interaction of the surfaces 56 and 58. This will delay loss of synchronization as said last named pressure weakens. As soon as the interference between the land 27 in the sleeve 20 and the balk tooth 62 is terminated by attainment of the relative positions shown in Figure 5, interengagement follows at once.

With the termination of all pressure urging the outer ring rightwardly, including that originating in the interaction of the surfaces 56 and 58 and that applied from the rightward force on the sleeve 20 acting through the surface 66 against the balk tooth 62, the outer ring 51 becomes free to move leftwardly away from the inner ring 50 in response to the urging of the springs 68 and it is likewise free to rotate with respect to both the inner ring 50 and the floating ring 52 sufficiently to permit it to move leftwardly to the limit permitted by the stop 77 on the screw 69. This returns the surfaces 71 and 72 again into circumferential alignment for preventing re-initiating of the above described self-energizing steps, even after the clutch teeth are again disengaged, excepting upon the further application of an axial, rightwardly directed, shifting force as described above.

While I have illustrated my invention in a specific embodiment thereof, it should be understood that certain variations may be made therein which will be within the scope of the hereinafter appended claims excepting as the claims may by their specific language expressly prohibit.

I claim:

1. In a device for synchronizing the speed of a first element having a first set of engageable teeth, and rotating at a selected rate, with the rotational speed of a coaxial second element, having a second set of teeth engageable with the first set of teeth and, prior to synchronization, rotating at a faster rate than, and in the same direction as, said first element, one of said sets of teeth being axially movable toward and away from the other set of teeth, the combination comprising: a first ring; a second ring coaxial with said first ring and connected with said first element; means solely on said rings effecting axial relative motion of said ring towards each other upon rotative motion of said first ring with respect to said second ring; one frictional surface rotatable with said first ring and a second frictional surface rotatable with said second ring, said surfaces engaging each other with increasing force as said rings move toward each other; and means integral with said rings holding said rings against rotative motion with respect to each other until an external force is applied urging said first ring toward said second ring.

2. In a device for synchronizing the rotational speed of a first toothed element having a first set of teeth, and rotating at a given rate, with the rotational speed of a coaxial, second toothed element, having a second set of teeth engageable with said first set of teeth and normally rotating at a faster rate than, and in the same direction as, said first element, one of said elements being axially movable toward and away from the other, the combination comprising: an inner ring secured to said first element and coaxial therewith; a plurality of wedge-shaped lugs secured to and extending radially from said inner ring near the periphery thereof; an outer ring coaxial with said inner ring and having a cylindrical flange extending therefrom and substantially encircling said inner ring, said flange having a plurality of wedge-shaped recesses receiving said lugs, said lugs cooperating with said recesses to draw said outer ring toward said first element when said outer ring is urged in said direction of rotation at a rate faster than said first element; means limiting the axial displacement of said outer ring with respect to said inner ring at a point permitting complete disengagement of said lugs and the walls of said wedge-shaped recesses; a floating ring rotatable with said second element; a plurality of alternately disposed coaxial friction and spacer plates positioned between said outer ring and said floating ring, said friction plates being rotatable with said outer ring and said spacer rings being rotatable with said floating ring; resilient means urging said inner and outer rings apart.

3. In a synchronizing mechanism for a pair of toothed clutch elements having a first set of teeth on a first clutch element and a second set of teeth on a second clutch element and wherein said second clutch element is in all conditions other than synchronization going faster than, and in the same direction as, said first clutch element, the combination comprising: means supporting said pair of toothed clutch elements for relatively shiftable movement into and out of engaged relation with each other; an outer ring supporting a plurality of annular friction plates in non-rotatable but axially movable relationship therewith; a floating ring rotatably supported upon said outer ring, axially immovably with respect to it, and supporting a second group of annular friction plates inter-leaved with said first group thereof, said plates being in non-rotatable, axially movable relationship with said floating ring; an annular flange on said outer ring coaxial therewith and having a slot in said flange, said slot having its circumferential end walls radially disposed and at an angle to the plane of rotation of said rings; a mounting ring supported on said clutch element having said first set of teeth and supporting said outer ring, said mounting ring having a radially disposed lug extending into said slot, said lug having angularly positioned faces on its circumferential ends interfitting with the end walls of said slot, said outer ring and said mounting ring being axially movable with respect to each other, and said angular faces being disposed at such an angle that rotation of said outer ring with respect to said mounting ring will draw said rings towards each other and thereby frictionally engage said plates; stop means positively limiting the distance said rings will move apart.

4. The device of claim 3 wherein those edges of said end walls and said circumferential ends which are opposing when said rings are axially separated have beveled surfaces oppositely positioned to the angular positioning of said walls and ends, and said stop means limiting separating movement of said rings be so placed that said beveled surfaces engage each other at the limit of said separating movement.

5. In a device for synchronizing the rotational speed of a first toothed element having a first set of teeth, and rotating at a given rate, with the rotational speed of a coaxial, second toothed element, having a second set of teeth engageable with said first set of teeth and normally rotating at a faster rate than, and in the same direction as, said first element, one of said elements being axially movable toward and away from the other, the combination comprising: an inner ring secured to said first element and coaxial therewith; a plurality of wedge-shaped lugs secured to and extending radially from said inner ring near the periphery thereof; an outer ring coaxial with said inner ring and having a cylindrical flange extending therefrom and substantially encircling said inner ring, said flange having a plurality of wedge-shaped recesses receiving said lugs, said lugs cooperating with said recesses to draw said outer ring toward said first element when said outer ring is urged in said direction of rotation at a rate faster than said first element; means limiting the axial displacement of said outer ring with respect to said inner ring at a point permitting complete disengagement of said lugs and the walls of said wedge-shaped recess; a floating ring rotatable with said second element; one frictional surface rotatable with said outer ring and one frictional surface rotatable with said floating ring, said outer ring and said floating ring cooperating to urge both of said frictional surfaces together with increasing force as said outer and said inner rings move axially towards each other.

6. In a device for synchronizing the rotational speed of a first toothed element having a first set of teeth, and rotating at a given rate, with the rotational speed of a coaxial, second toothed element, having a second set of teeth engageable with said first set of teeth and normally rotating at a faster rate than, and in the same direction as, said first element, one of said elements being axially movable toward and away from the other, the combination comprising: an inner ring secured to said first element and coaxial therewith; a plurality of wedge-shaped lugs secured to and extending radially from said inner ring near the periphery thereof; an outer ring coaxial with said inner ring and having a cylindrical flange extending therefrom and substantially encircling said inner ring, said flange having a plurality of wedge-shaped recesses receiving said lugs, said lugs cooperating with said recesses to draw said outer ring toward said first element when said outer ring is urged in said direction of rotation at a rate faster than said first element; means limiting the axial displacement of said outer ring with respect to said inner ring at a point permitting complete disengagement of said lugs and the walls of said wedge-shaped recesses; a floating ring rotatable with said second element; a frictional element adjacent said inner ring and substantially rotatable therewith, a second frictional element adjacent to said first frictional element and axially movable into and out of frictional contact therewith; means rotating said second frictional element with the rotation of said second toothed element, and means including means on said outer ring urging said frictional elements into frictional contact with each other upon movement of said outer ring axially toward said first element.

CHARLES M. PERKINS.

REFERENCES CITED

The following references are of record in the file of this patent:

UNITED STATES PATENTS

| Number | Name | Date |
| --- | --- | --- |
| 2,397,943 | Bull | Apr. 9, 1946 |
| 2,547,732 | Baker | Apr. 3, 1951 |